No. 619,343. Patented Feb. 14, 1899.
F. PRETZEL.
COUPLING FOR ROPES, CORDS, &c.
(Application filed Oct. 10, 1898.)

(No Model.)

Witnesses:
Carl Ruß.
R. Herpich.

Inventor:
Franz Pretzel
by Robert Kiefler
Attorney.

UNITED STATES PATENT OFFICE.

FRANZ PRETZEL, OF BERLIN, GERMANY.

COUPLING FOR ROPES, CORDS, &c.

SPECIFICATION forming part of Letters Patent No. 619,343, dated February 14, 1899.

Application filed October 10, 1898. Serial No. 693,164. (No model.)

*To all whom it may concern:*

Be it known that I, FRANZ PRETZEL, a subject of the King of Prussia, German Emperor, and a resident of Berlin, Kingdom of Prussia, German Empire, have invented certain new and useful Improvements in Couplings for Ropes, Cords, and the Like, of which the following is an exact specification.

This invention relates to a coupling device for ropes, cord, leather strips, and the like, and has for its object various improvements in the construction of the same.

Couplings or fastenings of the description hereinafter mentioned are usually employed to transmit the driving power for machines of almost every kind, the hitherto-employed couplings possessing, however, the disadvantage that to secure the parts of the coupling to the rope or cord screw-threads, pins, rivets, and the like were employed, which methods have been found to be inconvenient, impracticable, and unsafe.

To obviate these disadvantages is the object of my invention, which I hereinafter describe with reference to the accompanying drawings, annexed as part of this specification.

Figure 1:
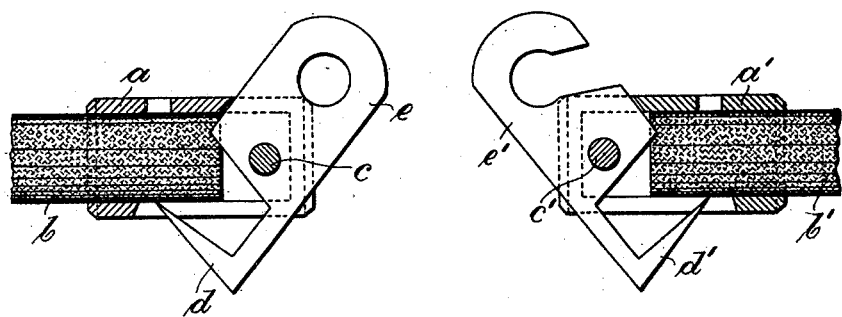
Figure 2:
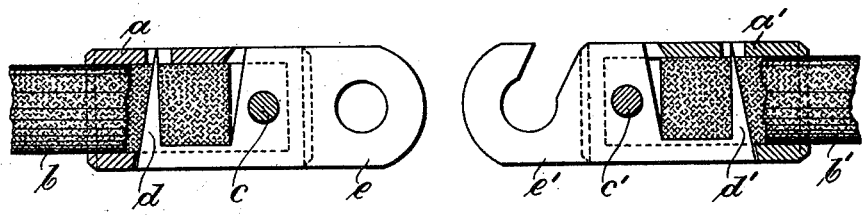

In the drawings, Figure 1 is a plan and part section, this figure showing the manner in which the coupling is secured to the rope or cord. Fig. 2 shows the cord or rope ends secured to the coupling parts.

Proceeding to describe the coupling proper, I remark that the same consists of two parts $a\ a'$, the end of each part or half being provided with a socket into which the cord ends $b\ b'$ are entered. At the opposite or free ends of the said sockets $a\ a'$ are the parts $e\ e'$, pivoted at $c\ c'$ and provided with a corresponding hook and eye, respectively, and also with the prongs or tapered pointed projections $d\ d'$.

The construction of the coupling will be clear from the drawings without further description.

The *modus operandi* is as follows: When the cord ends have been introduced into the sockets, the prongs $d\ d'$ of the lever-like parts $e\ e'$ are caused to pass through the cord end within the socket, whereby a safe, rapid, and convenient connection of the cord ends is attained. If desired, the end of each prong after having passed through the cord within the socket can be slightly riveted over to prevent the same working loose.

Having thus fully described the nature of my invention, what I desire to secure by Letters Patent of the United States is—

In a coupling for ropes, cord and the like, sockets $a\ a'$ into which the rope or cord ends are entered, in combination with lever-like parts $e\ e'$, pivoted at $c\ c'$ and provided with a hook and eye respectively, the said parts $e\ e'$ having prongs $d\ d'$ adapted in their open position to permit the cord ends to be pressed into the sockets and, in their closed position, by passing through the said cord ends, to securely hold the said cord, as set forth.

In witness whereof I have hereunto set my hand in presence of two witnesses.

FRANZ PRETZEL.

Witnesses:
 HENRY HASPER,
 C. H. DAY.